US005346023A

United States Patent [19]

Takagi et al.

[11] Patent Number: 5,346,023

[45] Date of Patent: Sep. 13, 1994

[54] SLIPPING TORQUE CHANGING APPARATUS FOR IMPACT TOOL

[75] Inventors: Toshiaki Takagi, Katsuta; Yoshihiko Watanabe, Ibaraki, both of Japan

[73] Assignee: Hitachi Koki Company Limited, Tokyo, Japan

[21] Appl. No.: 16,310

[22] Filed: Feb. 11, 1993

[51] Int. Cl.[5] .......... B23B 45/16

[52] U.S. Cl. .......... 173/178; 173/109; 192/56 R

[58] Field of Search .......... 173/104, 176, 178, 109; 192/34, 150, 56 R

[56] References Cited

U.S. PATENT DOCUMENTS

| | | | |
|---|---|---|---|
| 2,884,103 | 4/1959 | Connell | 192/56 R |
| 3,205,985 | 9/1965 | Pearl | 192/56 R |
| 3,616,883 | 11/1971 | Sindelar | 192/56 R |
| 4,386,689 | 6/1983 | Kato | 192/56 R |
| 4,610,340 | 9/1986 | Helmes et al. | 192/56 R |
| 4,732,217 | 3/1988 | Bleicher et al. | 173/104 |
| 4,883,130 | 11/1989 | Dixon | 192/56 R |
| 4,986,369 | 1/1991 | Fushiya et al. | 173/178 |

*Primary Examiner*—Scott A. Smith

*Attorney, Agent, or Firm*—Pollock, Vande Sande & Priddy

[57] ABSTRACT

A slipping torque changing mechanism for an impact tool includes a driving source for generating a rotational motion. A motion converting mechanism is connected with this driving source for converting the rotational motion of the driving source into a reciprocating motion. An impact mechanism is connected with this motion converting mechanism for transmitting the reciprocating motion to a tool end. A rotational motion transmitting mechanism is disposed separately from the motion converting mechanism for transmitting the rotational motion of the driving source to the tool end. A plurality of clutches, having different slipping torques, are disposed at different portions on the rotational motion transmitting mechanism.

10 Claims, 4 Drawing Sheets

SLIPPING TORQUE CHANGING APPARATUS FOR IMPACT TOOL

BACKGROUND OF THE INVENTION

1. Field of the Invention

The present invention relates to an impact tool such as an electrically operated hummer drill, which is constituted by various portions such as a motion converting mechanism portion, an impact mechanism portion, and a rotational motion transmitting mechanism portion.

2. Description of the Related Art

One example of a typical electrically operated hummer drill is disclosed in FIG. 7. A rotational motion of a rotor 2 is converted into a reciprocating motion through a fast gear 6, a crank shaft 5, a connecting rod 8, and a piston 9. This reciprocating motion of the piston 9 causes a compressional displacement of an air chamber 26.

In response to this compressional displacement, an impact member 14 is moved to cause a reciprocating motion. Furthermore, the impact member 14 pushes an intermediate impact member 15. Then, the motion of this intermediate impact member 15 is transmitted to a drill bit 16.

The rotational motion of the rotor 2 is, on the other hand, transmitted via the first gear 6, a second pinion 7, a second gear 19, a third pinion 17, a third gear 24, and a clutch 25 in this order. The clutch 25 is connected to a cylinder 13 through a key connection. The intermediate impact member 15 is engaged with the cylinder 13 by means of a spline 27, so that the intermediate impact member 15 rotates together with the cylinder member 13. As this intermediate impact member 15 is engaged with the drill bit 16 through a hexagon shaft 28, the rotational motion is finally transmitted to the drill bit 16.

The second gear 19 is freely rotatably supported around the third pinion 17 through a metal 11. Furthermore, there is provided a holder 21 housing a plurality of steel balls 20, 20 and engaging around the third pinion 17 with width across flats.

The steel balls 20, 20 are urged by a spring 22 through a plate 23, so as to press the second gear 19.

When the drill bit 16 is locked during the operation, the third pinion 17 and the second gear 19 are forced to lock together. However, the steel balls 20, 20 come out from recessed seats which are counter sunk on the second gear 19, when a predetermined large torque is applied on these balls 20, 20 against the spring force of the spring 22 pressing the second gear 19.

Therefore, even if the holder 21 housing the steel balls 20, 20 are locked together with the third pinion 17, the second gear 19 can cause slip. With this slip clutch mechanism, it becomes possible to prevent the main body of the hummer drill from being excessively swung around when the drill bit 16 is locked during the operation.

As shown in the foregoing description, only one slip clutch mechanism is provided on the shaft in the rotational motion transmitting mechanism portion. In other words, only one slipping torque is allowed to set for the impact tool. Accordingly, it was not possible for the worker to change the slipping torque of the impact tool.

SUMMARY OF THE INVENTION

Accordingly, the present invention has a purpose, in view of above-described problems or disadvantages, to provide a novel impact tool which is capable of varying the slipping torque at least between two values.

In order to accomplish above purposes, the present invention provides at least two slipping clutches having different slipping torques, being disposed on the shaft in the rotational motion transmitting mechanism portion, so as to vary the restricting level of the torque transmitted to the tool end.

Namely, there is provided a slipping torque changing apparatus for an impact tool comprising: a driving source for generating a rotational motion; a motion converting mechanism portion, connected with this driving source, for converting the rotational motion of said driving source into a reciprocating motion; an impact mechanism portion, being connected with this motion converting mechanism portion, for transmitting said reciprocating motion to a tool end; a rotational motion transmitting mechanism portion, being disposed separately from said motion converting mechanism portion, for transmitting the rotational motion of said driving source to the tool end; and a plurality of slipping clutches having predetermined different slipping torques, being disposed at different portions on said rotational motion transmitting mechanism portion, so as to cause slip when received said predetermined slipping torques, respectively.

In accordance with the impact tool constituted as described above, a plurality of slip clutches are selectively engaged or disengaged so that the slipping torque of the impact tool can be varied.

The above and other objects, features and advantages of the present invention will become more apparent from the following detailed description which is to be in read conjunction with the accompanying drawings.

DETAILED DESCRIPTION OF THE PREFERRED EMBODIMENT

Figure 1:
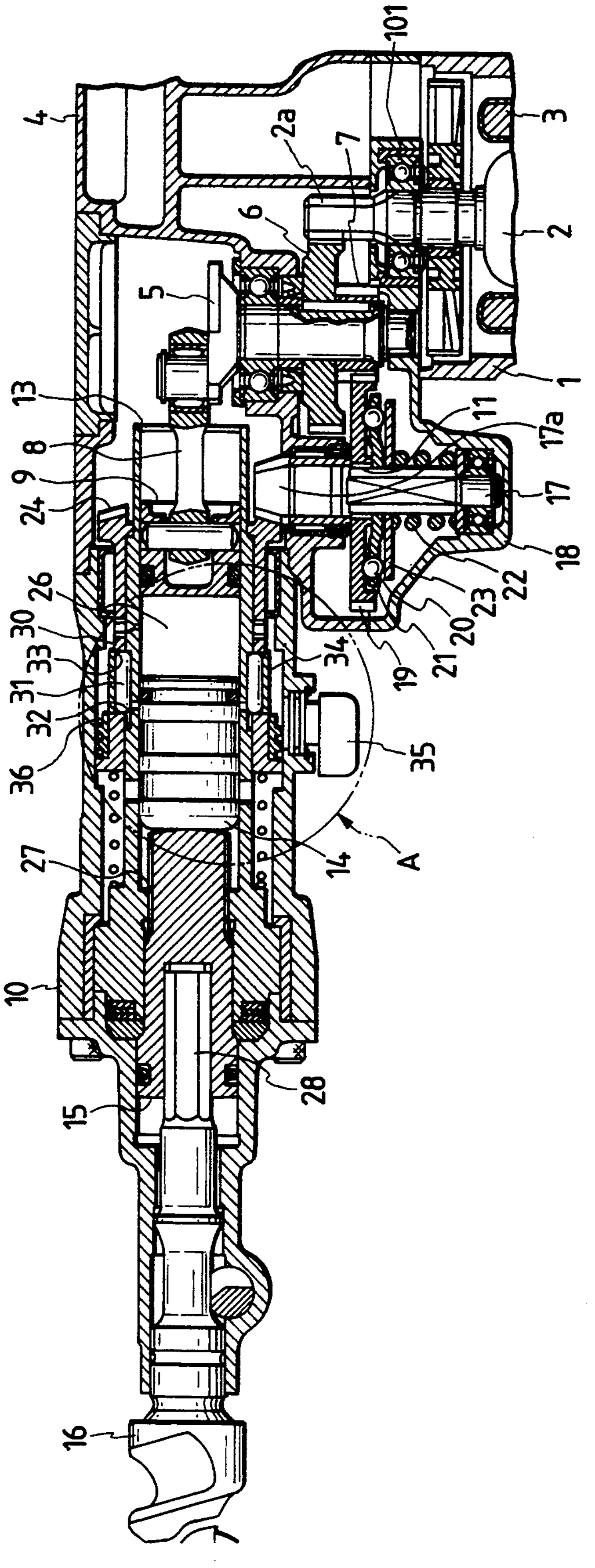
FIG. 1 is a vertical cross-sectional side view showing one example of a hummer drill in accordance with the present invention.

Hereinafter, with reference to accompanying drawings, a preferred embodiment of the present invention is explained in detail.

A housing 1 accommodates an electrically controlled motor comprising a rotor 2 and a stator 3. The rotor 2 is rotatably supported on a bearing 101 fixedly provided at an upper end of the housing 1, so as to protrude its pinion shaft 2a beyond the bearing 101.

The pinion shaft *2a* of the rotor 2 is engaged with a first gear 6. The first gear 6 is securely engaged with a crank shaft 5. A second pinion 7 is also securely engaged with the crank shaft 5. The first gear 6 has a larger diameter and is disposed to mesh with the pinion shaft *2a* of the rotor 2. The second pinion 7 has a smaller diameter and is disposed adjacent to the first gear 6. Both the first gear 6 and the second pinion 7 are fixedly engaged with the crank shaft 5 by way of key connection.

With this arrangement, the rotational motion of the rotor 2 is first of all inputted through the first gear 6 and then is split into two. One is transmitted via the route of the crank shaft 5, and the other is transmitted via the route of the second pinion 7.

The transmission route of the crank shaft 5 is related to or referred to as a motion converting mechanism portion, wherein the rotational motion of the rotor 2 is converted into the reciprocating motion of impact members.

In this transmission route of the crank shaft 5, the crank shaft 5 is connected with one end of a connecting rod 8. The connecting rod 8 is connected at the other end with a piston 9. The piston 9 is slidably inserted inside a cylinder 13, which is rotatably supported in a cylinder case 10. This cylinder case 10 is secured to the crank case 4. As well as the piston 9, an impact member 14, and an intermediate impact member 15 are also slidably inserted inside this cylinder 13. The intermediate impact member 15 is engaged with the cylinder 13 through a spline 27. The intermediate impact member 15 is connected with a drill bit 16 through a hexagon shaft 28. These impact member 14 and intermediate impact member 15 constitutes an impact mechanism portion.

On the other hand, the transmission route of the second pinion 7 is related to or referred to as a rotational motion transmitting mechanism portion, wherein the rotational motion of the rotor 2 is transmitted to the tool end as the same rotational motion.

In this transmission route of the second pinion 7, there is provided a second gear 19 which has a larger diameter and is disposed to mesh with the second pinion 7. This second gear 19 is freely rotatably supported around a third pinion shaft 17 through a metal 11.

The third pinion 17 is disposed in parallel with the crank shaft 5 or the pinion shaft *2a*, and perpendicular to the axial direction of the impact members 14, 15. This third pinion shaft 17 is rotatably supported at one end on the crank case 4 and at the other end on a gear cover 18.

Furthermore, there is provided a holder 21 housing a plurality of steel balls 20, 20 and engaging around the third pinion shaft 17 with width across flats. This holder 21 is fixedly engaged on the third pinion shaft 17 so as to rotate integrally.

A spring 22 is provided to urge the steel balls 20, 20 through a plate 23 toward the second gear 19, so that the second gear 19 can be pressed by these steel balls 20, 20.

The third pinion shaft 17 has a bevel gear portion *17a* on its upper end, being disposed adjacent to the right lower end of the cylinder 13. The bevel gear portion *17a* of the third pinion shaft 17 is meshed with a third gear 24, which has a cylindrical configuration and is disposed around and coaxially with the cylinder 13. At left side of this third gear 24, there is provided a first sleeve 30 having a cylindrical configuration and disposed around and coaxially with the cylinder 13.

Figure 2:
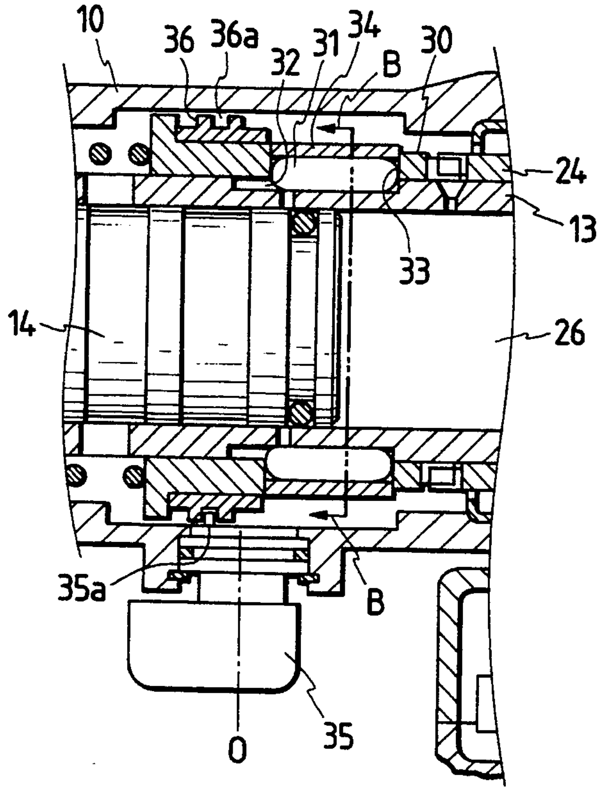
FIG. 2 is an enlarged side view showing a part of the hummer drill, designated by A in FIG. 1.

As shown in FIG. 2, the third gear 24 and the cylindrical first sleeve 30 are rotatably coupled around the cylinder 1S. The third gear 24 is engaged with the first sleeve 30 at their facing edges through clutch connection.

Therefore, the rotational motion of the second pinion 7 is transmitted through the second gear 19, the steel balls 20, 20, the holder 21, the third pinion shaft 17, and the third gear 24 to the first sleeve 30.

Figure 3:
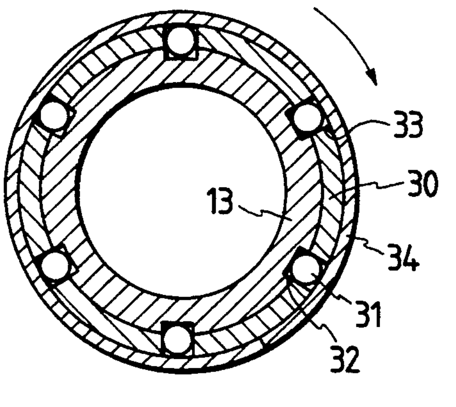
FIG. 3 is a cross-sectional view taken along a line B—B of FIG. 2, for explanatorily showing an operational condition of a slipping clutch in a low torque transmitting condition.

Furthermore, as shown in FIG. 3, the cylinder 13 has an outer surface being formed with a plurality of grooves 32, 32, so that needles 31, 31 can be partly housed therein. That is, six grooves 32, 32 are provided to extend along an axial direction of the cylinder 13 and are uniformly spaced from one another. The depth of each groove 32 is shallow compared with the diameter of each needle 31. In more detail, the depth of each groove 32 is designed to be smaller than the radius of the needle 31. Therefore, if the needle 31 is pushed in a circumferential direction, the needle 31 rises on a shoulder *13a* of the cylinder 13 and comes out of the groove 32.

On the other hand, the first sleeve 30 is formed with a plurality of elongated through holes 33, 33 thereon. The needles 31, 31 are accommodated in these through holes 33, 33. Around the first sleeve 30, there is coaxially provided a C-shaped spring 34 having substantially the cylindrical configuration. This C-shaped spring 34 is coupled around the first sleeve 30, so as to allow the needles 31, 31 to come out of the grooves 32, 32 and also to prevent the needles 31, 31 from being fallen off.

Therefore, the C-shaped spring 34 has elasticity sufficient to yield outward when received a predetermined expanding force. However, if this expanding force is not so large, the C-shaped spring 34 is sufficiently rigid to prevent the needles 31, 31 from coming out of the grooves 32, 32. Therefore, the rotational force can be firmly transmitted from the first sleeve 30 to the cylinder 13 via the needles 31, 31 in the normal operation of the impact tool.

Returning to the transmission route of the crank shaft 5, the rotational motion of the rotor 2 is transmitted through the fast gear 6, the crank shaft 5, and the connecting rod 8 and is converted into a reciprocating motion of the piston 9.

The reciprocating motion of this piston 9 causes a compressional displacement of an air chamber 26. In response to this compressional displacement, the impact member 14 is pushed toward the left to cause impulsive motion (reciprocating motion) along an axial direction thereof. Then, being pushed by this impact member 14, the intermediate impact member 15 disposed to abut this impact member 14 causes the same impulsive motion (reciprocating motion) along an axial direction thereof. Thereafter, the motion of this intermediate impact member 18 is transmitted to the tool end; i.e. the drill bit 16.

On the contrary, in case of the transmission route of the second pinion 7, the rotational motion of the rotor 2 is transmitted via the first gear 6, the second pinion 7, the second gear 19, the steel balls 20, the holder 21, the third pinion 17, the third gear 24, the first sleeve 30, the needle 31, the cylinder 13, the intermediate impact member 15, to the drill bit 16.

Next, the slipping clutch mechanism in accordance with the present invention will be described.

One slipping clutch (hereinafter, referred to as a first slipping clutch) provided on the third pinion 17 is constituted such that the steel balls 20, 20 start slipping against the urging force of the spring 22 when a large amount of torque more than a predetermined value is applied thereon. In other words, the second gear 19 being pushed by the steel balls 20, 20 causes free rotation in this condition without accompanying the substantial torque transmission.

Figure 4:
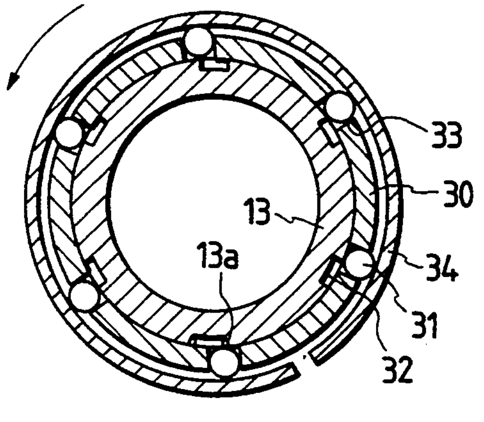
FIG. 4 is a cross-sectional view taken along a line B—B of FIG. 2, for explanatorily showing an operational condition of the slipping clutch in a large torque transmitting condition.

The other slipping clutch (hereinafter, referred to as a second slipping clutch) provided on the cylinder 13 is constituted such that, the needles 31, 31 expand the C-shaped spring 34 outward against its springback force, as shown in FIG. 4, in the case where a certain amount of torque more than a predetermined value, which is different from (i.e. smaller than) the above predetermined value of the first slipping clutch, is applied on the needles 31, 31.

Thus, the needles 31, 31 come out of the grooves 32, 32 and therefore the first sleeve 30 causes slip against the cylinder 13. Therefore, the first sleeve 30 causes free rotation around the sleeve 13 in this condition without accompanying the substantial torque transmission.

In this embodiment, the slipping torque of the first slipping clutch provided on the third pinion 17 is set larger than that of the second slipping clutch provided on the cylinder 13.

Next, the switching mechanism of these two slipping clutches is explained.

Figure 5:
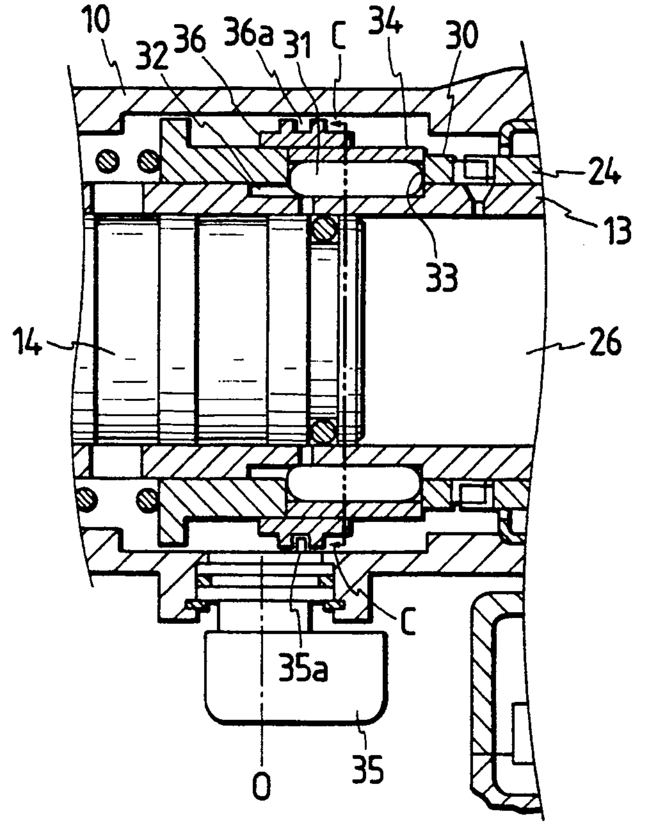
FIG. 5; is an enlarged side view showing the part of the hummer drill, designated by A in FIG. 1.
Figure 6:
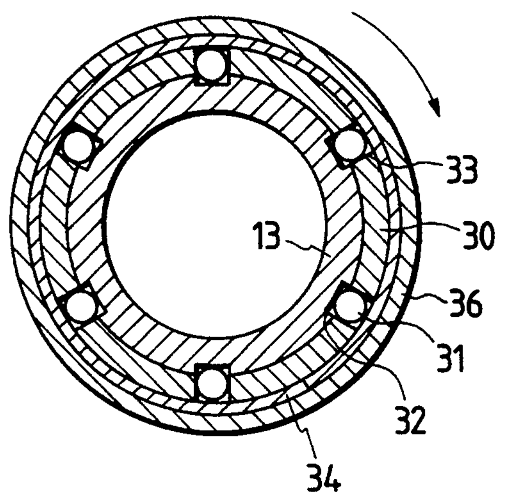
FIG. 6 is also a cross-sectional view taken along a line C—C of FIG. 5, for explanatorily showing another operational condition of the slipping clutch.
Figure 7:
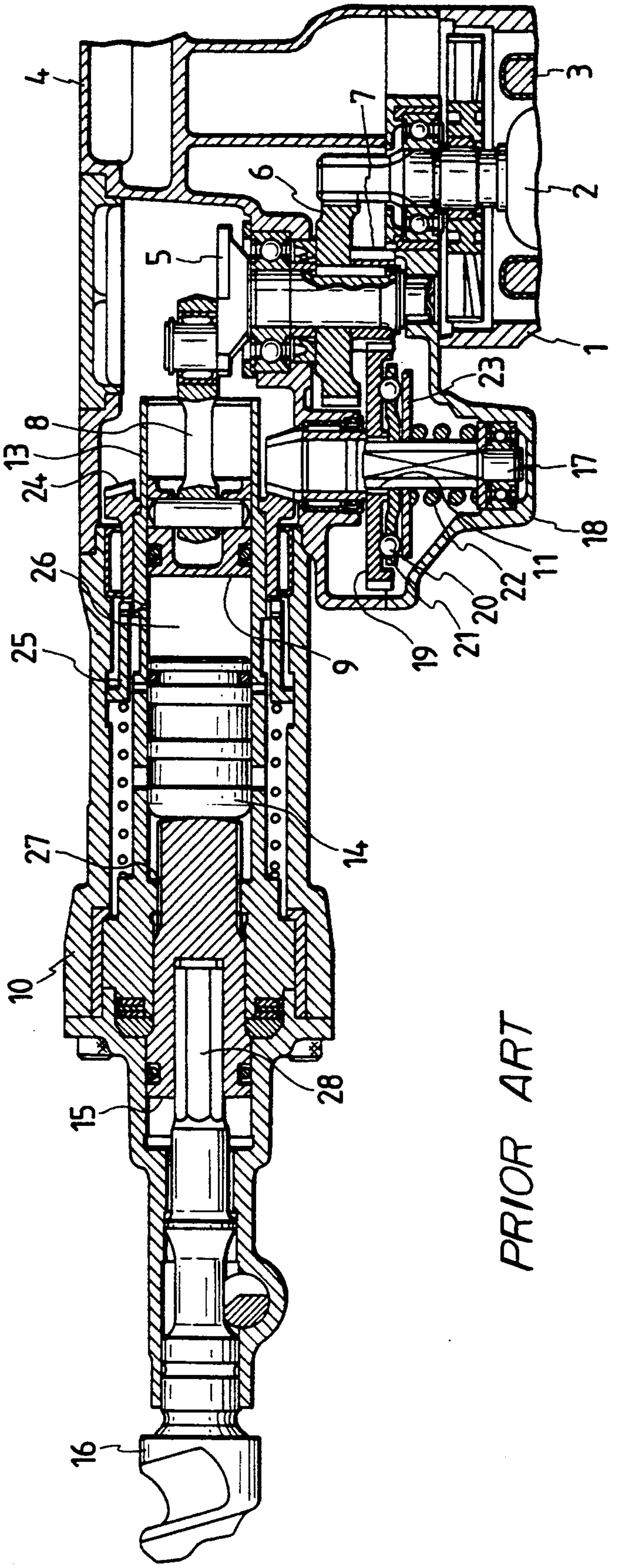
FIG. 7 PRIOR ART
FIG. 7 is a vertical cross-sectional side view showing one example of a typical hummer drill.

The switching mechanism of slipping clutches is basically constituted by utilization of a lock-unlock member. As shown in FIGS. 1, 2, and 5, a cylindrical second sleeve 36 is coaxially disposed around the first sleeve 30. This cylindrical second sleeve 36 has a guide groove **36*a*** formed on an outer surface thereof in a circumferential direction.

This guide groove **36*a* cooperates with a handle lever 35 so as to shift the second sleeve 36. A projection 35*a* is formed on the base surface of the handle lever 35, being offset from the rotational center O. When the handle lever 35 is rotated, the projection 35*a* rotates together about its rotational center O. This projection 35*a* is slidably engaged with the guide groove 36*a*. Therefore, when the handle lever 35 is turned, the second sleeve 36 engaging with the projection 35*a* of the handle lever 35 is shifted along the axial direction of the cylinder 13 in accordance with rotational movement of the projection 35*a*; i.e. rotational movement of the handle lever 35**.

As shown in FIG. 2, the second sleeve 36 is positioned at axially left end so as not to interfere with expanding motion of the C-shaped spring 34. On the other hand, if the second sleeve 36 is shifted toward the right as shown in FIG. 5, the second sleeve 36 is positioned to completely restrict the expanding motion of the C-shaped spring 34.

Namely, when a small slipping torque is required, the second sleeve 36 is positioned at the left end as shown in FIG. 2, by manipulating the handle lever 35. In this condition (i.e. unlocking condition), the second slipping clutch on the cylinder 13, which has a smaller slipping torque, works first. Therefore, the slipping torque of this impact tool is substantially determined by this second slipping clutch.

On the other hand, when a large slipping torque is required, the second sleeve 36 is shifted toward the right end as shown in FIG. 5, by rotating the handle lever 35. In this condition (i.e. locking condition), the second sleeve 36 prevents the C-shaped spring 34 from expanding outward. Therefore, the function of the second slipping clutch is destroyed. And, only the first slipping clutch on the third pinion 17, which has a larger slipping torque, substantially works.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to be embraced by the claims.

What is claimed is:

1. A slipping torque changing apparatus for an impact tool comprising:

a driving source for generating a rotational motion:

a motion converting mechanism portion, connected with said driving source, for converting the rotational motion of said driving source into a reciprocating motion;

an impact mechanism portion, being connected with said motion converting mechanism portion, for transmitting said reciprocating motion to a tool end;

a rotational motion transmitting mechanism portion, being disposed separately from said motion converting mechanism portion, for transmitting the rotational motion of said driving source to the tool end; and first and second slipping clutches being disposed at different portions on said rotational motion transmitting mechanism portion;

said first slipping clutch having a slipping torque larger than a slipping torque of said second slipping clutch;

said second slipping clutch including a lock-and-unlock member for selectively locking and unlocking said second slipping clutch, so that the second slipping clutch works prior to said first slipping clutch when said lock-and-unlock member is positioned to unlock the second slipping clutch, and conversely, does not work prior to said first slipping clutch when said lock-and-unlock member is positioned to lock the second slipping clutch.

2. A slipping torque changing apparatus in accordance with claim 1 in which said lock-and-unlock member is connected to a handle member, so that an operator can manipulate said lock-and-unlock member by hand.

3. A slipping torque changing apparatus in accordance with claim 2 in which said lock-and-unlock member is formed with a guide portion, and said handle member is formed with and engaging portion which can engage with said guide portion of said lock-and-unlock member.

4. A slipping torque changing apparatus in accordance with claim 3 in which said lock-and-unlock member is a cylindrical member and said guide portion is formed on an outer surface thereof in a circumferential direction as a guide groove.

5. A slipping torque changing apparatus in accordance with claim 4 in which said engaging portion of the handle member is a projection, which protrudes from the handle member so as to slidably engage into said guide groove of said lock-and-unlock member.

6. A slipping torque changing apparatus in accordance with claim 3 in which said engaging portion of the handle member is disposed offset from a rotational center of the handle member, so that the engaging portion rotates about a rotational center of the handle member when the handle member is turned.

7. A slipping torque changing apparatus in accordance with claim 6 in which said engaging portion of the handle member cooperates with a guide groove of the lock-and-unlock member so as to shift the lock-and-unlock member in such a manner that, when the handle member is turned, the lock-and-unlock member engaging with the engaging portion of the handle member is switched between a lock position and an unlock position in accordance with rotational movement of the handle member.

8. A slipping torque changing apparatus in accordance with claim 1 in which said lock-and-unlock member is a slidable member which is changed over between a lock position and an unlock member.

9. A slipping torque changing apparatus in accordance with claim 8 in which said second slipping clutch includes a cylindrical elastic member and said lock-and-unlock member has a cylindrical shape, wherein said lock-and-unlock member suppresses said cylindrical elastic member of the second slipping clutch from expanding.

10. A slipping torque changing apparatus in accordance with claim 9 in which said cylindrical elastic member of said second slipping clutch is a C-shaped sleeve.

* * * * *